United States Patent [19]

Hulsing, II

[11] Patent Number: 5,070,263
[45] Date of Patent: Dec. 3, 1991

[54] COMPACT DUAL ROTOR TORQUE MOTOR FOR ACCELEROMETERS

[75] Inventor: Rand H. Hulsing, II, Redmond, Wash.

[73] Assignee: Sundstrad Data Control, Inc., Redmond, Wash.

[21] Appl. No.: 652,505

[22] Filed: Feb. 8, 1991

[51] Int. Cl.$^5$ .......................... H02K 33/12; G01P 9/04
[52] U.S. Cl. ........................................ 310/22; 73/505; 310/15; 310/36
[58] Field of Search ..................... 73/505, 510; 310/15, 310/22, 36, 81

[56] References Cited

U.S. PATENT DOCUMENTS

| | | | |
|---|---|---|---|
| 3,312,842 | 4/1967 | Heuchling et al. | 310/17 |
| 3,828,213 | 8/1974 | Yamashita et al. | |
| 4,013,911 | 3/1977 | Fujiwara et al. | |
| 4,642,539 | 2/1987 | Hinds | |
| 4,821,572 | 4/1989 | Hulsing, II | 73/505 |
| 4,968,909 | 11/1990 | Hulsing, II | 310/17 |

FOREIGN PATENT DOCUMENTS 917094 3/1982 U.S.S.R.

Primary Examiner—Steven L. Stephan
Assistant Examiner—D. L. Rebsch
Attorney, Agent, or Firm—Christensen, O'Connor, Johnson & Kindness

[57] ABSTRACT

A torque motor for rotatably driving a rate sensor (10, 100) which includes a permanent magnet (30) that is magnetically coupled to an upper rotor (18, 106) and a lower rotor (44, 110). At three sites, the upper rotor includes an upper tab (60), which is centered between two electromagnetic coils (56, 58). Similarly, at each site, the lower rotor includes two lower tabs (62) that extend adjacent opposite faces of the electromagnetic coils. With no electrical current flowing through the electromagnetic coils, flexures (46) that connect the upper and lower rotors to a base (12) provide a spring bias force sufficient to maintain the upper tab centered in a slot (66) and thus, equidistant between each of the two lower tabs. As the electric current flows through the electromagnetic coils, distribution of the magnetic flux produced by the permanent magnet changes so that the upper tab is attracted toward one of the electromagnetic coils and repelled from the other. At the same time, the lower tabs are respectively repelled from and attracted toward the opposite faces of the electromagnetic coils. Thus, the upper and lower rotors dither back and forth in opposite directions about a central axis of rotation (78) each time the electromagnetic coil polarity changes because of a change in the direction of electrical current flow through the electromagnetic coils.

21 Claims, 7 Drawing Sheets

COMPACT DUAL ROTOR TORQUE MOTOR FOR ACCELEROMETERS

TECHNICAL FIELD

This invention generally pertains to electromagnetic motors, and more specifically, to motors having a stator that includes an electromagnetic coil and a rotor that is magnetically driven to rotate bi-directionally through a limited angle with respect to the stator.

BACKGROUND OF THE INVENTION

In commonly assigned U.S. Pat. No. 4,821,572, a multi-axis angular rate sensor is disclosed. This device includes a plurality of accelerometers mounted on two frame members and is configured to allow the frame members to rotate about a common axis. A drive mechanism comprising first and second C-shaped electromagnetic coils and associated pole pieces is used to counter-rotate the frame members about the common axis without transmitting a reaction force to a supporting base. As the electromagnetic coils are alternately and sequentially energized with an electric current, the frame members are driven to rotatably dither back and forth in opposite directions.

Several problems are associated with the drive mechanism used in the multi-axis rate sensor disclosed in the above-referenced patent. Although the frame members rotate only a few degrees in each direction, the first and second electromagnetic coils are energized by current supplied through leads that are continually flexed as a result of the dither motion of the device. Eventually, even the most flexible conductors available may work-harden and break. Since the coils are attached adjacent the periphery of the frame members, the mass and rotational inertia of the frame members are substantially increased by the addition of the coils—even though an important design goal for this device was to minimize these parameters.

Conventional direct current (dc) electromagnetic motors capable of developing the torque required to drive the multi-axis rate sensor are comparatively bulky. Their bulk is necessary to accommodate permanent magnets, ferrous metal flux linkage members, and pole pieces that focus the magnetic flux across air gaps in the motor. A rotor in a conventional dc motor typically includes armature windings that are energized with electrical current conveyed through brushes, which produce undesirable radio frequency (RF) noise and are subject to wear. The mass of such a rotor and its inertia prevent it from quickly stopping and reversing direction. Accordingly, a conventional dc motor is not usable to drive the multi-axis rate sensor described above. Such motors are neither sufficiently compact, nor do they include a rotor that is sufficiently low in mass and inertia to rapidly rotate back and forth through a small incremental angle at the required rate. Since prior art dc motors are not easily adapted to this application, it has been necessary to develop a new motor to drive the multi-axis rate sensor.

To meet this need, a new compact torque motor, which provides bi-directional, limited angle, reactionless torque was developed for driving the multi-axis rate sensor. This motor is described in a copending, commonly assigned patent application, Ser. No. 07/369,373, filed on June 21, 1989 now U.S. Pat. No. 4,968,909. The motor includes an X-shaped core and two pole pieces that are disposed at opposite sides of the core. Two pairs of opposed legs on the core thus define transverse core sections. Electromagnetic coils are formed on the legs of each core section, and when the coils on the two core sections are alternately energized, the resulting magnetic force attracts tabs that are disposed on the ends of the pole pieces, causing the pole pieces to counter-rotate back and forth about a central axis. Because the pole pieces are lightweight, rotational inertia of the motor is low and its efficiency is high.

Further improvements in the design of the multi-axis rate sensor have created a need for an even more compact torque motor than that just described. Ideally, a suitable torque motor should make use of one or more components required for other aspects of the rate sensor in order to reduce the total number of parts and to minimize the mass, size, and cost of the device. For example, the new rate sensor design uses a permanent magnet and a plurality of electromagnetic coils to monitor the velocity of the accelerometers as the frame members in which they are mounted dither back and forth. Since the permanent magnet is already in use for this purpose, a torque motor that uses the same permanent magnet to drive the rotors and the accelerometers to dither back and forth achieves the desired reduction in parts count and cost.

Accordingly, it is an object of the present invention to provide a dc motor that has very lightweight rotors, yet generates relatively high torque. A further object is to provide a motor that produces bi-directional torque simply by changing the direction in which electrical current flows through the motor, where the torque is independent of the extent of rotation for rotor rotation up to about ±1.5 degrees. These and other objects and advantages of the present invention will be apparent from the attached drawings and the Description of the Preferred Embodiments that follow.

SUMMARY OF THE INVENTION

In accordance with the present invention, a torque motor includes a magnet disposed along a central rotational axis of the torque motor and having opposite first and second pole faces through which the rotational axis extends. A first rotor is magnetically linked to the first pole face. Similarly, a second rotor is magnetically linked to the second pole face. A base, disposed generally between the first rotor and the second rotor, supports the torque motor and is thus fixed relative to movement of the first and second rotors. Flexure means are provided to elastically connect the first and second rotors to the base so that the first and second rotors pivotally rotate about the central rotational axis in respect to the base. The flexure means provide a spring biasing force that resists the rotation of the first and second rotors. Electromagnetic coil means attached to the base provide a magnetic field that interacts with the magnetic field of the magnet, producing a torque that causes the rotors to pivotally rotate in opposite directions, i.e., to counter-rotate.

In addition, the torque motor includes pole piece means disposed proximate the pole faces of the magnet and proximate the first and second rotors, for magnetically linking the magnetic field of the magnet to the first and second rotors. The pole piece means comprise a pair of members, each member of the pair being disposed at one of the pole faces of the magnet and extending in overlying relationship to one of the first and second rotors. Each member of the pole piece means are separated from the first and the second rotors by a pole piece gap.

The electromagnetic coil means comprise a plurality of electromagnets disposed in spaced-apart relationship, generally circumferentially about the rotational axis of the torque motor, and mounted on the base, including at least one pair of electromagnets.

The first and the second rotors include a plurality of tabs that are generally aligned with the rotational axis. Each electromagnet of the pair is disposed between one of the tabs on the first rotor and one of the tabs on the second rotor. These tabs extend into slots formed in the base, on opposite sides of the electromagnets. Also, one of the tabs on one of the first and the second rotors extends between the pair of the electromagnets, and the pair of electromagnets are disposed between the two tabs that extend from the other of the first and the second rotors.

A source of electrical current is connected to energize the electromagnets. The electromagnets in each pair are wound in a series-aiding direction with a conductor so that adjacent poles of the electromagnets are opposite in magnetic polarity for a given direction of electrical current flow through the conductor. The first and the second rotors pivotally rotate back and forth in opposite directions as the flow of electrical current changes direction. Elastic linkage means extend between the first and the second rotors, thereby maintaining a generally constant phasic relationship in the movement of the first and the second rotors. Non-linearities of the flexure means and of force developed by the interaction of the magnetic fields are combined at a resonant Q to yield substantially a linear torque.

DESCRIPTION OF THE PREFERRED EMBODIMENTS OF THE INVENTION

Multi-axis Rate Sensor

Figure 1:
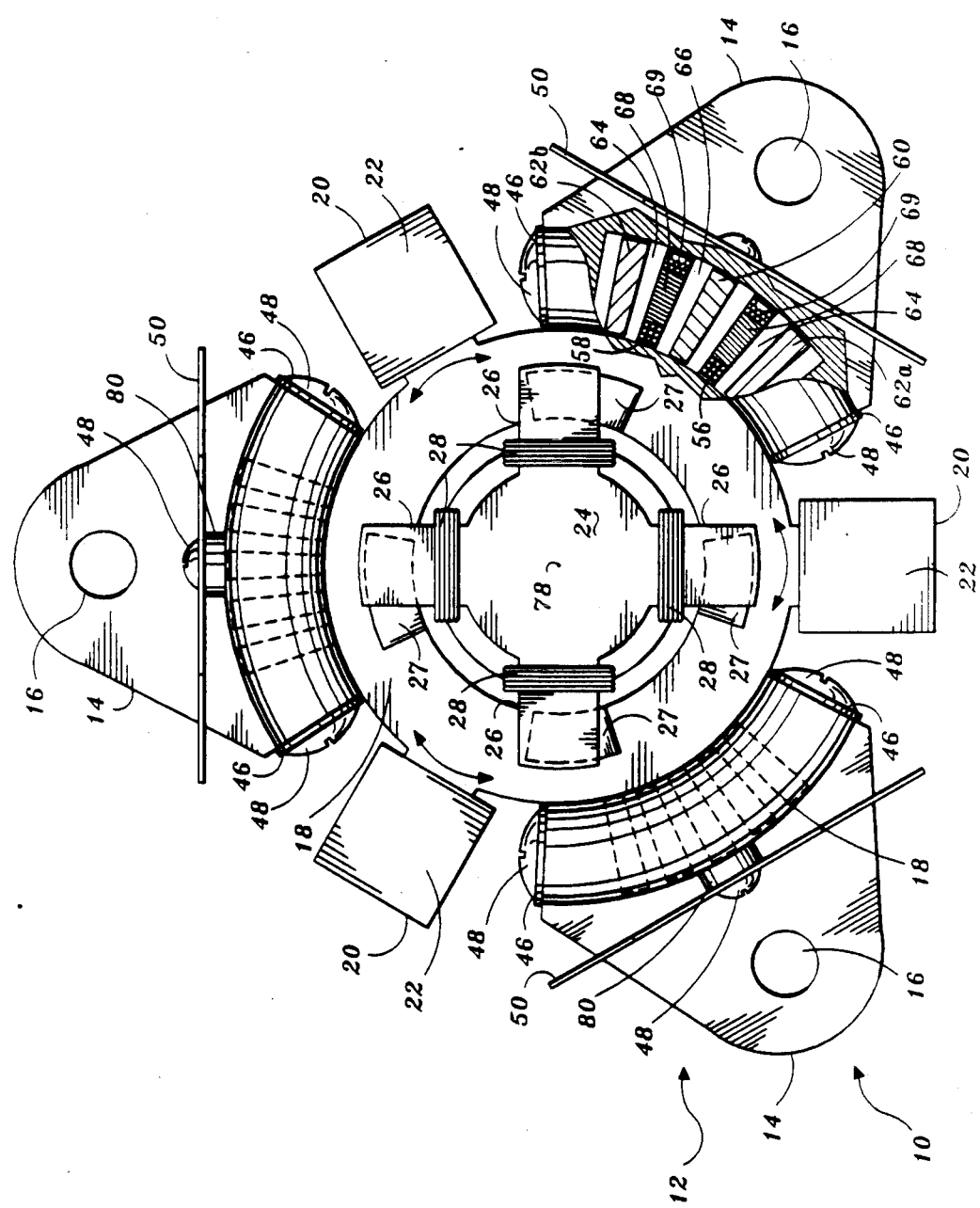
FIG. 1 is a plan view of a rate sensor, including a top rotor and a bottom rotor on which a plurality of accelerometers are mounted so as to rotatably dither back and forth about a central axis when driven by the present torque motor, a portion of the top rotor being cut away to show two electromagnetic coils of the torque motor.
Figure 2:
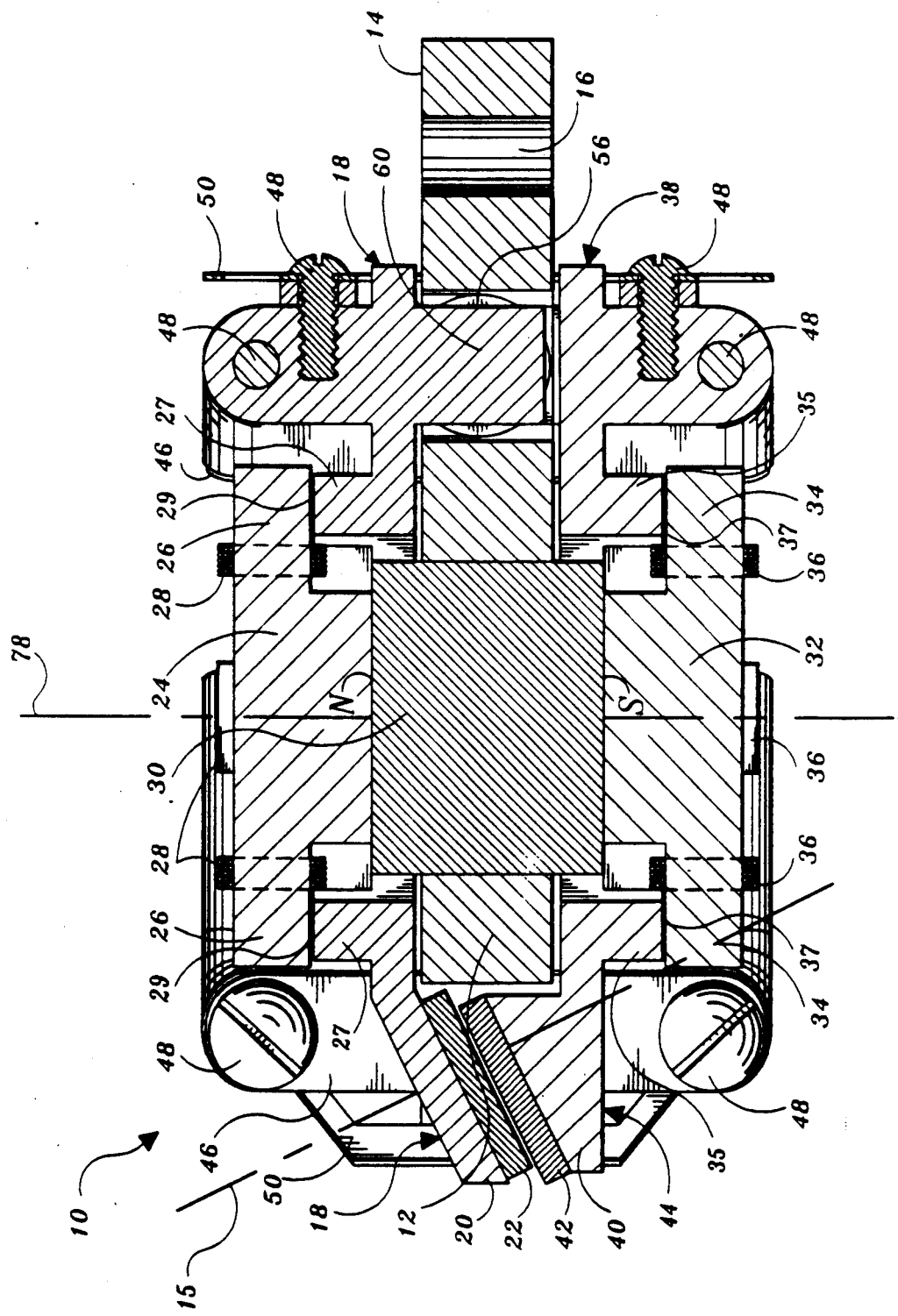
FIG. 2 is a side elevational view of the rate sensor, cut away to show a permanent magnet mounted at its center.
Figure 3:
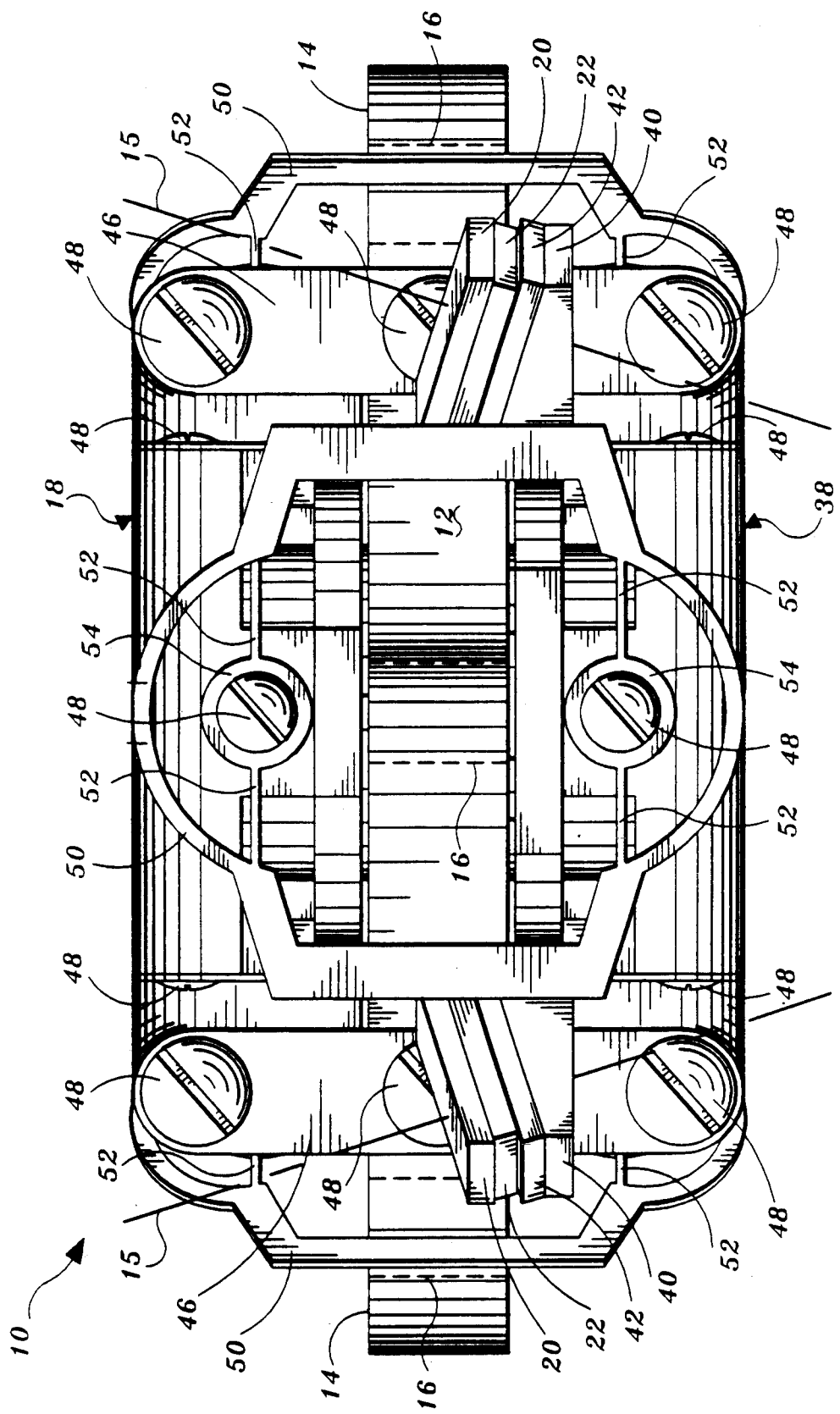
FIG. 3 is an elevational view of the torque motor.

The present invention is preferably used in connection with a multi-axis angular rate sensor, which is shown in FIGS. 1-3 generally at reference numeral 10. Operation of rate sensor 10 for sensing rate of rotation about each of three orthogonal axes is described in commonly assigned U.S. Pat. No. 4,821,572, the specification of which is incorporated herein by reference. Rate sensor 10 includes a base 12 that has three mounting flanges 14, radially disposed about a central axis of rotation 78. Flanges 14 are equally spaced apart from each other, so that base is generally shaped like an equilateral triangle. Within each flange 14 is provided a mounting hole 16 through which a fastener (not shown) can be inserted to mount rate sensor 10 to a supporting body (also not shown). Rate sensor 10 includes an upper rotor 18 from which three accelerometer mounts 20 radially extend, each accelerometer mount being generally centered between two adjacent flanges 14. The angle between a line 15 normal to each accelerometer mount and axis of rotation 78 preferably equals 35.26°. An accelerometer 22 is attached to each accelerometer mount 20 so that the acceleration-sensitive axis of the accelerometer is parallel with line 15 and thus, is perpendicular to each of the accelerometer mounts. Upper rotor 18 is centered about central axis of rotation 78.

An upper pole piece 24 is centrally disposed within upper rotor 18 and the center of the upper pole piece is aligned with central axis of rotation 78. Four pole piece arms 26 extend radially outward from the center of upper pole piece 24, so that the ends of the arms overlie elevated steps 27, which are formed on the upper surface of upper rotor 18, defining pole gaps 29. Each pole piece arm 26 includes a velocity sensing coil 28 that is used to produce a feedback signal indicative of the rate of rotational displacement of the upper rotor with respect to base 12. The rotational motion of upper rotor 18 with respect to base 12 is provided by the torque motor of the present invention as will be explained below.

Referring to FIG. 2, a cross-sectional view of rate sensor 10 shows a permanent magnet 30 fixedly mounted at the center of base 12, so that its north and south poles are generally aligned with central axis of rotation 78. Upper pole piece 24 is in contact with a north pole face N of permanent magnet 30 in the preferred embodiment of the torque motor shown in FIG. 2; however, it will be understood that the north pole face N and a south pole face S of permanent magnet 30 can readily be reversed without affecting the overall operation of either rate sensor 10 or the torque motor comprising the present invention that drives it.

Similarly, a lower pole piece 32, which is shaped generally like upper pole piece 24, is in contact with the opposite pole face (i.e., south pole S in the preferred embodiment) of permanent magnet 30. Lower pole piece 32 also includes four radial pole piece arms 34 around which velocity sensing coils 36 are wound. Each radially extending arm overlies an elevated step 35 that is formed on the lower surface of a lower rotor 38, defining a pole gap 37. Velocity sensing coils 36 produce a signal corresponding to the rate of rotation of a lower rotor 38, which is concentrically disposed about central axis of rotation 78. Extending radially outward from lower rotor 38 are three accelerometer mounts 40, which are also angled so that lines 15 are normal to their surfaces. Accelerometer mounts 40 are disposed immediately adjacent accelerometer mounts 20. On each accelerometer mount 40 is mounted an accelerometer 42, closely spaced adjacent one of the accelerometers 22. Accelerometers 42 each have their acceleration sensitive axes aligned parallel with lines 15, i.e., perpendicular to the respective accelerometer mounts 40.

As shown most clearly in FIG. 3, upper rotor 18 and lower rotor 38 are each connected to base 12 by means of a plurality of vertically extending flexures 46, which are radially aligned about central axis of rotation 78. Each flexure 46 is connected to upper rotor 18, base 12, and lower rotor 38 using three threaded fasteners 48. Flexures 46 thus support the upper and lower rotors so that they are free to pivotally rotate back and forth with respect to base 12 through a limited angle of rotation as flexures 46 bend. In the preferred embodiment, upper and lower rotors 18 and 38 only rotate through an angle of about at ±1.5°.

If only flexures 46 were provided to connect the upper and lower rotors to base 12, it is possible that upper rotor 18 might rotate out of synchronization in respect to lower rotor 38, due to vibration or other external forces that are transmitted to one of the rotors, but not to the other. For this reason, links 50 connect upper rotor 18 and lower rotor 38, extending around each flange 14. Link 50 has an open oval shape with two cross flexures 52 disposed as chords across each end. Each cross flexure 52 includes a central attachment ring 54 through which a threaded fastener 48 is installed to connect the link to top rotor 18 and lower rotor 38.

Description of Torque Motor

As shown in FIG. 1, each flange 14 includes a pair of electromagnetic coils 56 and 58, which are mounted in notches 59 formed within base 12. Electromagnetic coils 56 and 58 are spaced apart from each other, and include cores 68 that are circumferentially aligned about central axis of rotation 78. Cores 68 of electromagnetic coils 56 and 58 are wound series-aiding with a conductor 69. Thus, when energized with an electric current from a power source (not shown) a magnetic flux is developed in core 68 of each electromagnetic coil 56 and 58, which is generally polarized in the same direction; i.e., the adjacent faces of cores 68 in each pair of electromagnetic coils 56 and 58 become opposite magnetic poles. Furthermore, as the direction of the electrical current flowing through conductor 69 around cores 68 in electromagnetic coils 56 and 58 changes, the magnetic flux developed in their cores 68 changes polarity causing the magnetic poles on their faces to reverse.

Figure 4A:
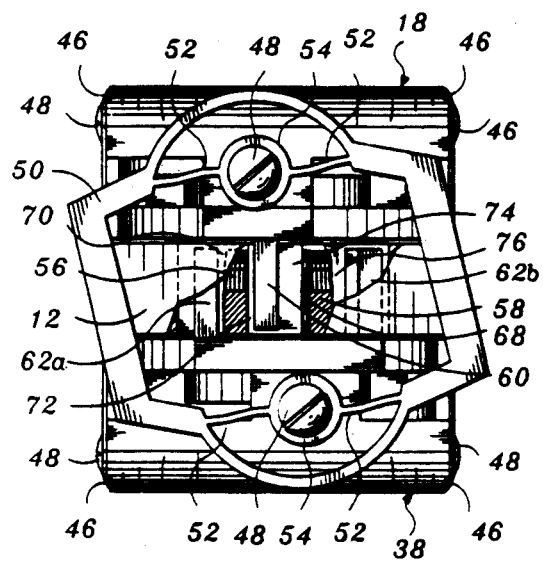
FIGS. 4A-4C are enlarged schematic side views of the rotors and one pair of coil assemblies of the torque motor, showing three positions of the rotors as they dither back and forth, the remainder of the rate sensor having been cut away for clarity.
Figure 4B:
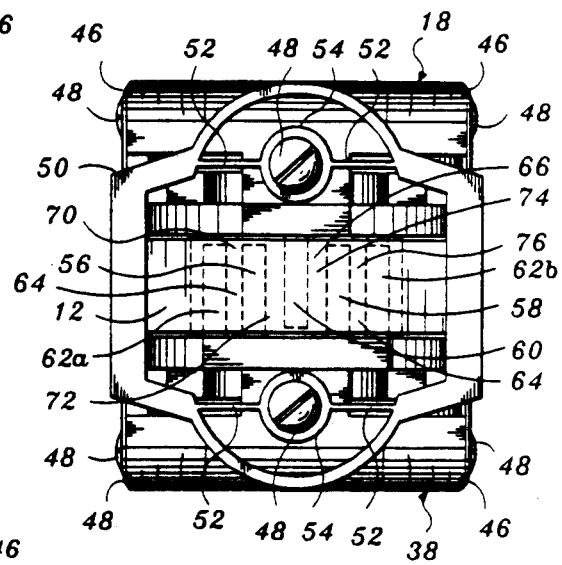
Figure 4C:
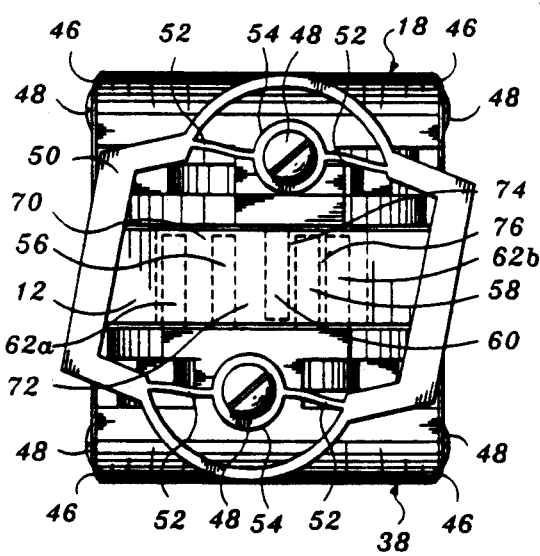

Upper rotor 18 includes an upper tab 60, shown in FIGS. 4A and 1, which extends downwardly into a slot 66 formed between adjacent pole faces of cores 68 in each pair of electromagnetic coils 56 and 58. A pole gap 72 is defined between core 68 of electromagnetic coil 56 and upper tab 60, while a pole gap 74 is defined between the upper tab and core 68 of electromagnetic coil 58. Lower rotor 38 includes two lower tabs 62a and 62b that extend upwardly into slots 64. Slots 64 are disposed adjacent the outwardly facing faces of each pair of electromagnetic coils 56 and 58. A pole gap 70 is defined between lower tab 62a and electromagnetic coil 56, and a pole gap 76 is defined between lower tab 62b and electromagnetic coil 58. The relationship between upper tab 60 and the two lower tabs 62 in respect to each pair of electromagnetic coils 56 and 58 is perhaps best shown in FIG. 4B. In this view, these elements are shown (using phantom lines) in the centered position in which they remain at rest when no current is applied to energize electromagnetic coils 56 and 58.

It is the interaction of the magnetic flux developed by permanent magnet 30 and the magnetic flux produced by an electrical current flowing through each pair of electromagnetic coils 56 and 58, which is disposed within each of the three flanges 14, that produces the rotational torque causing upper rotor 18 and lower rotor 38 to rotationally dither back and forth in opposite directions about central axis of rotation 78. The magnetic flux developed by permanent magnet 30 is linked through upper pole piece 24, radial pole piece arms 26 and elevated steps 27 into upper rotor 18. Similarly, magnetic flux from permanent magnet 30 is linked through lower pole piece 32, radial pole piece arms 34, and elevated steps 35 into lower rotor 38. The relatively small pole gaps 29 separating radial pole piece arms 26 from elevated steps 27 and small pole gaps 37 separating elevated step 35 from radial pole piece arms 34 enable excellent flux linkage between permanent magnet 30 and upper and lower rotors 18 and 38. Accordingly, each upper tab 60 represents an extension of the magnetic north pole face N of permanent magnet 30, and each lower tab 62 represent an extension of the magnetic south pole face S of permanent magnet 30.

When electromagnetic coils 56 and 58 are energized with an electric current flowing first in one direction and then in the other, the magnetic flux developed in cores 68 of each of the electromagnetic coils causes either an attraction or repulsion to be developed (as a function of magnetic polarity), producing a torque that rotates upper rotor 18 and lower rotor 38 in opposite directions. Specifically, as shown in FIG. 4A, when the electrical current flowing through electromagnetic coils 56 and 58 causes a magnetic south pole to be developed on the face of electromagnetic coil 56 adjacent to upper tab 60, and a magnetic north pole to be developed on the adjacent face of electromagnetic coil 58, the magnetic north polarity of upper tab 60 causes it to be attracted to electromagnetic coil 56 and repelled from electromagnetic coil 58. Conversely, lower tab 62a, which has a magnetic south polarity, is attracted to the magnetic north pole face on electromagnetic coil 56; tab 62b is repelled by the magnetic south pole on the adjacent face of electromagnetic coil 58. The attraction and repulsion of lower tabs 62 in respect to electromagnetic coils 56 and 58 causes lower rotor 38 to rotate to the right and upper rotor 18 to rotate in the opposite direction. As shown in FIG. 4A, this counter-rotation of the upper and lower rotors causes cross flexures 52 of link 50 to "S-bend" and twists link 50. Because link 50 elastically connects the rotors, it synchronizes their motion relative to each other, keeping them in phase.

As the electric current through electromagnetic coils 56 and 58 changes direction, the magnetic poles developed on cores 68 of the electromagnetic coils change polarity, reversing the magnetic attraction/repulsion acting on upper tab 60 and lower tabs 62a and 62b at each of the flanges 14. As a result of current reversal, upper tab 60 is attracted to electromagnetic coil 58 and repelled from electromagnetic coil 56, while lower tab 62a is attracted to electromagnetic coil 58, and lower tab 62b is repelled from electromagnetic coil 56. Again, links 50 synchronize the motion of the upper and lower rotors as cross flexures 52 S-bend.

The magnetic flux developed as a result of electrical current flowing through electromagnetic coils 56 and 58 interacts with the magnetic flux of permanent magnet 30 to produce the torque that rotates the upper and lower rotors. Flux from permanent magnet 30 divides equally in each of radial pole piece arms 26 and 34. An AlNiCo magnet of a type suitable for use as permanent magnet 30 can develop approximately 8 kilogauss across pole gaps 29 and 37. The division of this magnetic flux provides approximately 1.3 kilogauss at pole gaps 70/72 and 74/76 between each upper tab 60 and each of lower tabs 62a and 62b (assuming that the total cross-sectional area of the flux path between these elements is conserved). By providing two pole gaps 70/72 and 74/76 (one on each side as upper tab 60) for the magnetic flux developed at each of the three sites by permanent magnet 30, the rotational magnetic attraction between the upper and lower return paths are essentially cancelled. Thus, with no electric current flowing through electromagnetic coils 56 and 58 at each site, only the magnetic flux of permanent magnet 30 flows between each upper tab 60 and the two lower tabs 62 between which the upper tab is centered. With upper tab 60 centered in slot 66 at the midpoint between the two lower tabs 62, the attraction between the upper tab and each of the lower tabs is equal and opposite. This centered or midpoint position of upper tab 60 within slot 66 and of each lower tab 62 within slots 64 represents an unstable null point; however, the force exerted by flexures 46 is sufficient to maintain upper tab 60 centered between the two lower tabs 62.

Figure 5A:
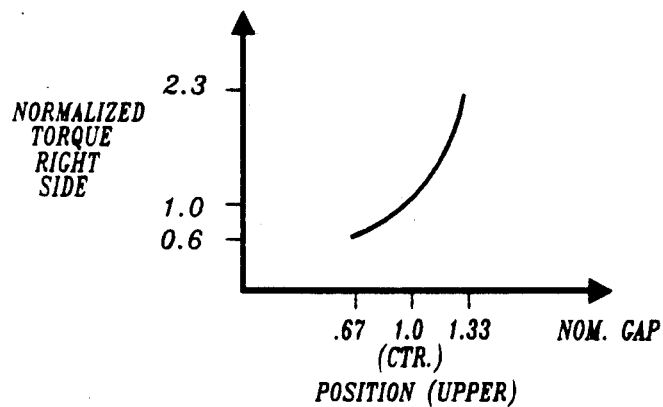
FIGS. 5A-5C are graphs that show the relationship between the nominal position of the upper rotor (horizontal axis) and the normalized torque acting on the upper rotor (vertical axis) when the electromagnetic coils are energized with an electrical current.
Figure 5B:
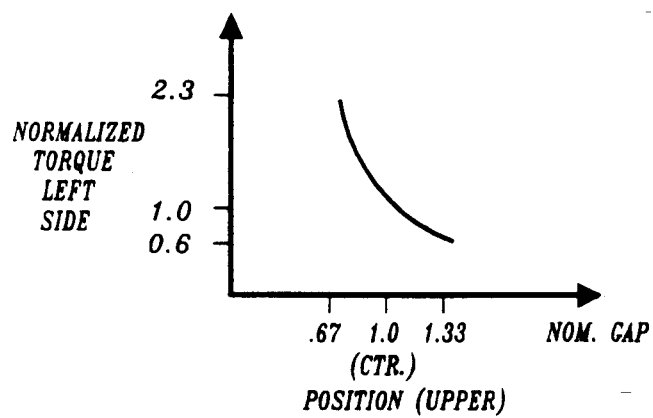
Figure 5C:
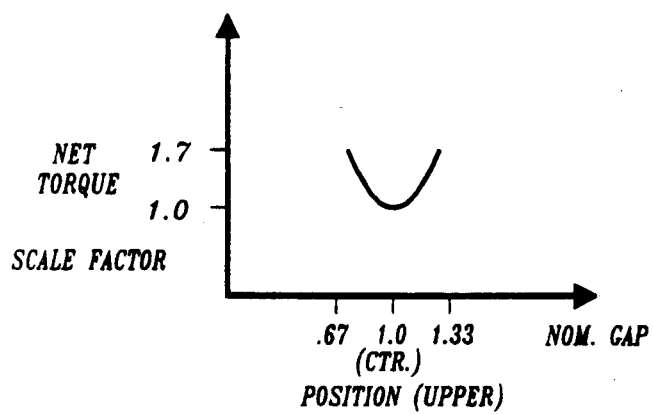

FIGS. 5A-5C graphically illustrate a normalized torque developed by electromagnetic coils 56 and 58 that acts on upper tab 60 in respect to its relative position within slot 66. The position of upper tab 60 is represented in FIGS. 5A-5C as a nominal gap, wherein the value "1.0" represents the position of upper tab 60 when it is centered between electromagnetic coils 56 and 58 in slot 66. The torque applied to upper tab 60 by electromagnetic coil 58 increases nonlinearly from a normalized value of 0.6 when the upper tab is at a position 33% to the left of its center position to a normalized value of 2.3 when the upper tab is approximately 33% to the right of its centered position within slot 66. Similarly, in FIG. 5B, the normalized torque applied to upper tab 60 by electromagnetic coil 56 is illustrated as a function of the position of the upper tab, decreasing nonlinearly from a normalized value of 2.3 to a normalized value of 0.6 as the upper tab moves farther away from the electromagnetic coil. Addition of the two normalized torques developed on the left and right side of upper tab 60 produces a net torque acting upon the upper tab due to electromagnetic current flow through both electromagnetic coils 56 and 58, as illustrated in FIG. 5C.

Figure 6A:
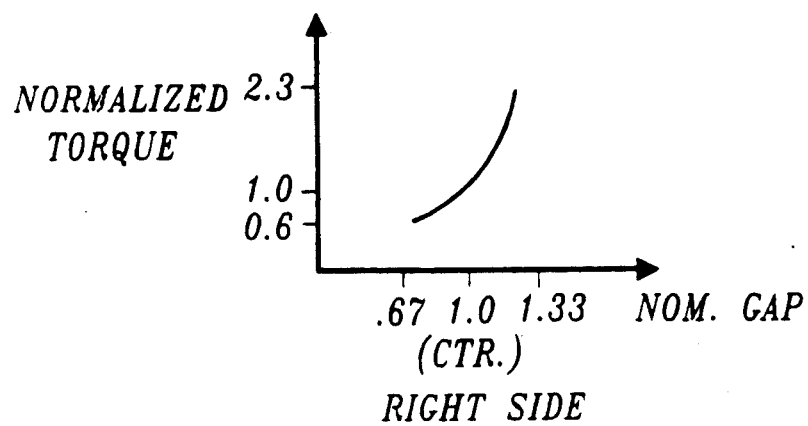
FIGS. 6A-6C are graphs that illustrate the torque acting on the upper rotor due to the permanent magnet alone (vertical axis), as a function of the rotor position (horizontal axis)
Figure 6B:
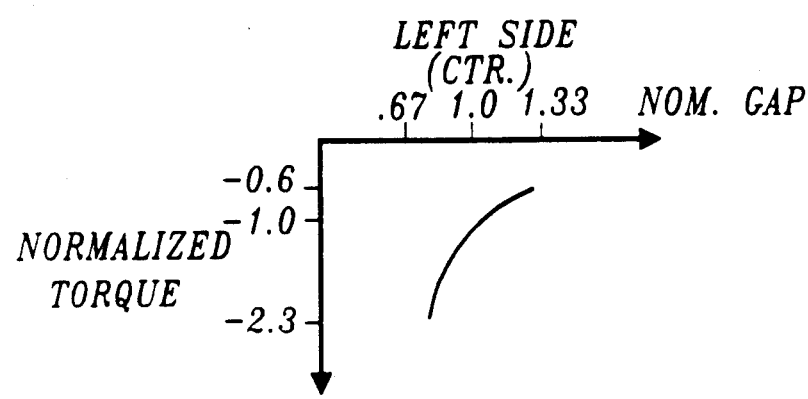
Figure 6C:
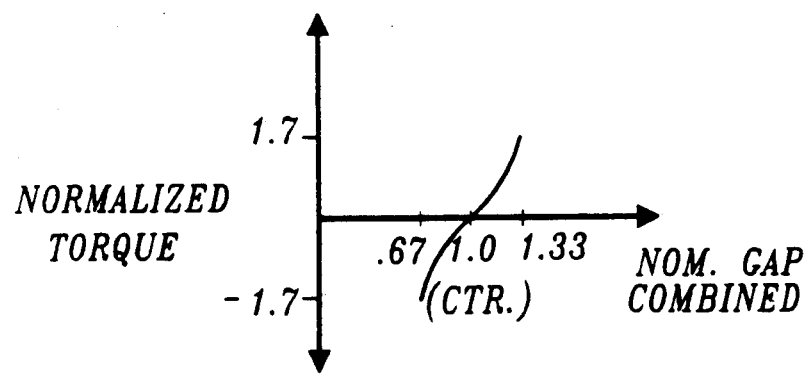

When no electrical current flows through electromagnetic coils 56 and 58, the magnetic attraction (due only to permanent magnet 30) between upper tab 60 and one of the lower tabs 62 increases as the rotors are displaced from their centered positions, while it decreases in respect to the other lower tab 62. Thus, a differential force is developed that causes the flux from permanent magnet 30 to decrease on one side, while increasing proportionally on the other side of upper tab 60. The resulting torque that acts upon upper tab 60 is nonlinear and inversely proportional to the square of the nominal gap spacing between the upper and lower tabs. As shown in FIG. 6A, the normalized torque between upper tab 60 and lower tab 62b varies nonlinearly with respect to a nominal gap between the two, wherein on the horizontal axis, the value "1.0" represents the position of upper tab 60 when centered between the two lower tabs 62. Torque due to the magnetic flux from permanent magnet 30 thus increases nonlinearly from a normalized minimum value of 0.6 to a maximum value of 2.3 as the gap spacing between upper tab 60 with respect to lower tab 62 on the right changes by −33% to +33%. Normalized torque acting on upper tab 60 with respect to lower tab 62a ranges from −2.3 to −0.6 as the nominal gap spacing changes from −33% to +33%, as shown in FIG. 6B. FIG. 6C illustrates the normalized net torque that results from algebraically combining the normalized net torque acting on both the left and right side of upper tab 60. This normalized net torque ranges from −1.7 to +1.7 as upper tab 60 moves by 33% to each side of the center of slot 66.

Assuming that flexures 46 have a third order nonlinearity of approximately 5% and that the torque motor supplies approximately 10% of the force required to change the direction of upper and lower rotors 18 and 38, the normalized change in net torque over the range of travel of the rotors is cancelled to within about 0.1% over the ±33% of gap travel. The effective spring constant for flexures 46 decreases approximately 2.5% due to the difference between a third-order function that defines the flexure force contribution and the second-order function describing the torque developed as a result of the magnetic flux interaction. At a resonant Q operating point selected for the torque motor the third-order non-linearities of flexures 46 and the second-order non-linearities of the magnetic flux interaction combine to yield substantially a linear torque over the limited rotation angle of the rotors.

Figure 7:
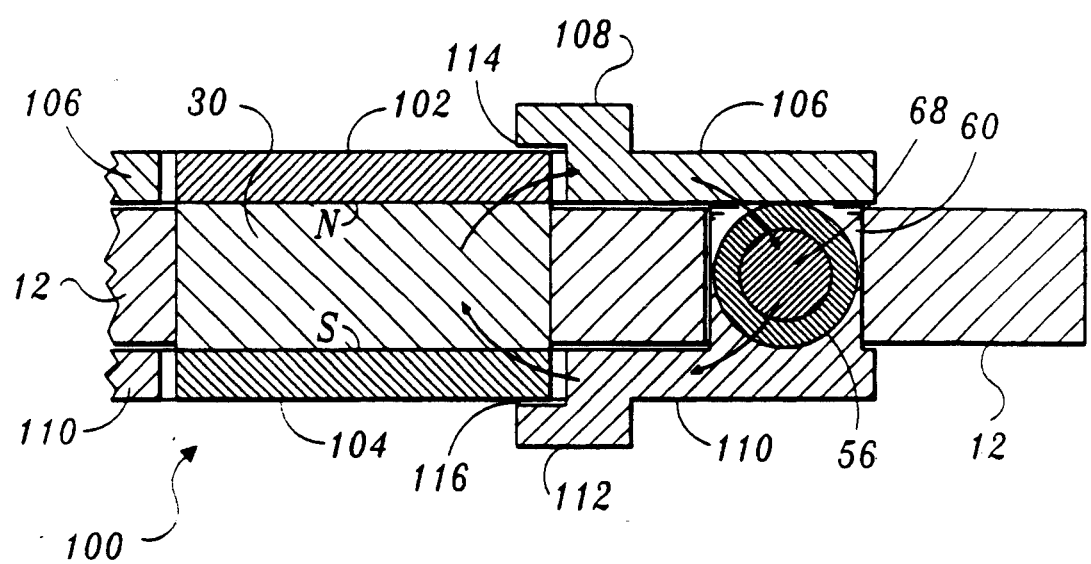
FIG. 7 is a schematic elevational cut-away view illustrating a second embodiment of the torque motor.

Rate sensor 10 is driven using a preferred embodiment of the torque motor comprising the present invention. However, it will be apparent to those of ordinary skill in the art that alternative configurations of the torque motor, which exhibit the same advantages can be constructed. One such configuration is shown in a partial cross-sectional view in FIG. 7. FIG. 7 illustrates a portion of a rate sensor 100 that differs from rate sensor 10 primarily in respect to the configuration of its upper and lower pole pieces. In rate sensor 100, an upper pole piece 102 is generally contiguous with the north face N of permanent magnet 30. Similarly, south pole face S of permanent magnet 30 is covered by a lower pole piece 104. An upper rotor 106 includes an inwardly extending elevated step 108 that overlies upper pole piece 102, providing a pole piece gap 114 through which magnetic flux from permanent magnet 30 passes. A lower rotor 110 similarly includes an inwardly extending stepped elevated step 112 that overlies lower pole piece 104, defining a pole gap 116. The magnetic flux of the permanent magnet is thus linked by the pole pieces to upper tab 60 and the lower tabs 62 (not shown). Interaction of the magnetic flux of permanent magnet 30 and the magnetic flux developed by the electromagnetic coils produces a torque that drives upper rotor 106 and lower rotor 110 to dither back and forth as already explained with respect to rate sensor 10.

Although the present invention is disclosed in an application wherein it drives two rotors to counter-rotate back and forth through a limited angle, the invention can also be applied to drive other loads. For example, although not shown, two linear loads can be counter-driven back and forth along a linear axis by interaction of the magnetic flux of a permanent magnet and of a pair of electromagnetic coils using much the same configuration as disclosed above. However, instead of rotating the rotors (or loads) move linearly.

Those of ordinary skill in the art will appreciate that further modifications to the present invention can be made within the scope of the claims that follow. Accordingly, it is not intended that the disclosure of the preferred embodiment and modifications thereto in any way limit the scope of this invention.

The invention in which an exclusive property or privilege is claimed is defined as follows:

1. A torque motor comprising:
   (a) a magnet having opposite first and second pole faces at which a magnetic field is evident;
   (b) a first load that is magnetically linked to the first pole face of the magnet;
   (c) a second load that is magnetically linked to the second pole face of the magnet;
   (d) a base disposed proximate the first load and the second load, the base supporting the torque motor and fixed relative to the first and second loads;
   (e) flexure means for elastically connecting the first and second loads to the base so that the first and second loads can move with respect to the base, the flexure means providing a spring biasing force that resists the motion of the first and second rotors; and
   (f) electromagnetic coil means, attached to the base, for providing a magnetic field that interacts with the magnetic field of the magnet, thereby producing a torque causing the first and second loads to move in opposite directions relative to each other.

2. The torque motor of claim 1, further comprising pole piece means disposed proximate the pole faces of the magnet and proximate the first and the second loads, for magnetically linking the magnet to the first and second loads.

3. The torque motor of claim 2, wherein the pole piece means comprise a pair of members, each member of the pair being disposed at one of the pole faces of the magnet, extending in overlying relationship to the first and the second loads, and separated from the first and the second loads by a pole piece gap.

4. The torque motor of claim 1, wherein the electromagnetic coil means comprise a plurality of electromagnets arranged in spaced-apart relationship.

5. The torque motor of claim 4, wherein a pair of the electromagnets are mounted on the base.

6. The torque motor of claim 5, wherein the first and the second loads include a plurality of tabs, each electromagnet of the pair being disposed between one of the tabs on the first load and one of the tabs on the second load.

7. The torque motor of claim 6, wherein the tabs extend into slots formed in the base on each side of the electromagnets.

8. The torque motor of claim 6, wherein one of the tabs on one of the first and the second loads extends between the pair of electromagnets, and the pair of electromagnets is disposed between two tabs that extend from the other of the first and second loads.

9. The torque motor of claim 8, further comprising a source of electrical current connected to energize the electromagnets, said electromagnets being wound in a series-aiding direction with a conductor so that adjacent poles of the electromagnets are opposite in magnetic polarity for a given direction of electrical current flowing through the conductor.

10. The torque motor of claim 9, wherein the first and the second loads pivotally rotate back and forth in opposite directions from each other, as a function of the rate at which the electrical current changes direction.

11. The torque motor of claim 1, further comprising elastic linkag means that extend between the first and the second loads, for maintaining a generally constant phasic relationship in the movement of the first and second rotors.

12. A torque motor comprising:
   (a) a base that supports the torque motor;
   (b) a first rotor that is disposed on one side of the base and pivotally connected to the base so that the first rotor rotates through a limited extent about a central axis with respect to the base;
   (c) a second rotor disposed on an opposite side of the base from the first rotor and pivotally connected to the base so that the second rotor rotates through a limited extent about the central axis with respect to the base;
   (d) a plurality of flexures elastically connecting the first and the second rotors to the base, the flexures providing a spring bias force that resists rotation of the first and second rotors in respect to the base;
   (e) magnetic means for generating a magnetic field that couples into the first and second rotors; and
   (f) a plurality of electromagnets, spaced apart from each other and disposed circumferentially around the central axis of the torque motor, each electromagnet producing a magnetic field that interacts with the magnetic field coupled into the first and second rotors, thereby providing a torque that acts on the first and second rotors, the magnetic field produced by the electromagnets changing polarity as an electric current flowing through the electromagnets changes direction, so that the first and the second rotors dither back and forth about the central axis.

13. The torque motor of claim 12, further comprising a first pole piece disposed proximate the magnetic means and the first rotor, and a second pole piece disposed proximate the magnetic means and the second rotor, the first and second pole pieces being operative to link the magnetic field of the magnetic means to the first and second rotors, respectively.

14. The torque motor of claim 12, wherein the first and second rotors each comprise a corresponding plurality of spaced-apart segments extending generally circumferentially about the central axis of the torque motor, one segment of the first rotor together with one segment of the second rotor comprising a set, each segment in the set including at least one tab that extends generally in alignment with the central axis, proximate to one of the electromagnets.

15. The torque motor of claim 14, wherein a pair of electromagnets are provided for each set of segments, one segment of the set having one tab that extends between adjacent poles of the pair of electromagnets, and the other arm of the set including two tabs that extend adjacent opposite poles of the pair of electromagnets, the pair of electromagnets thus being interleaved between the tabs on the segments in the set.

16. The torque motor of claim 14, wherein the base includes a plurality of slots into which the tabs on the segments of the first and second rotors extend.

17. The torque motor of claim 14, further comprising a plurality of flexible links, each flexible link extending between the radially outer ends of the segments in each set to maintain a phase relationship between the first and second rotors as they dither back and forth.

18. The torque motor of claim 12, further comprising a source of electrical current connected to energize the electromagnets, causing them to produce a magnetic field that interacts with the magnetic field produced by the magnetic means, the direction of electrical current flow through the electromagnets determing their magnetic polarity and controlling the rate at which the first and the second rotors dither back and forth.

19. The torque motor of claim 12, wherein the magnetic means comprise a permanent magnet mounted to the base, generally at the center of the torque motor.

20. The torque motor of claim 12, wherein the flexures each comprise an elastic elongate strip having a surface generally radially aligned about the central axis, an end of the elongate strip being attached to one of the first and second rotors, another part of the elongate strip being attached to the base, rotation of the rotors about the central axis causing the elongate strips to bend, thereby producing a spring bias force that tends to limit the extend of the rotational motion by the first and second rotors.

21. The torque motor of claim 12, wherein the flexures are characterized by a third-order non-linearity and the magnetic fields that interact produce a non-linear force, an operational resonant Q being selected for the torque motor such that a combination of the third-order non-linearity of the flexures and the non-linear force of the magnetic field interaction produce substantially a linear torque over a predefined rotation angle.

* * * * *